United States Patent
Hirose et al.

(10) Patent No.: US 10,035,919 B2
(45) Date of Patent: Jul. 31, 2018

(54) PHOTOCURABLE INK COMPOSITION FOR INKJET PRINTING

(71) Applicant: SAKATA INX CORPORATION, Osaka (JP)

(72) Inventors: Tadashi Hirose, Osaka (JP); Kazuhiro Fuke, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 0 days.

(21) Appl. No.: 15/549,372

(22) PCT Filed: Dec. 15, 2015

(86) PCT No.: PCT/JP2015/085004
§ 371 (c)(1),
(2) Date: Aug. 7, 2017

(87) PCT Pub. No.: WO2016/136097
PCT Pub. Date: Sep. 1, 2016

(65) Prior Publication Data
US 2018/0030290 A1 Feb. 1, 2018

(30) Foreign Application Priority Data
Feb. 26, 2015 (JP) .................................. 2015-037076

(51) Int. Cl.
| | |
|---|---|
| B41J 11/00 | (2006.01) |
| C09D 11/101 | (2014.01) |
| C09D 11/322 | (2014.01) |
| C09D 11/38 | (2014.01) |
| C09D 11/107 | (2014.01) |
| C09D 11/30 | (2014.01) |
| B41J 2/01 | (2006.01) |

(52) U.S. Cl.
CPC .......... *C09D 11/101* (2013.01); *B41J 11/002* (2013.01); *C09D 11/107* (2013.01); *C09D 11/30* (2013.01); *C09D 11/322* (2013.01); *C09D 11/38* (2013.01); *B41J 2/01* (2013.01)

(58) Field of Classification Search
CPC . B41J 2/01; B41J 11/002; B41M 5/00; C09D 11/02; C09D 11/30; C09D 11/38; C09D 11/101; C09D 11/107; C09D 11/322
See application file for complete search history.

(56) References Cited

U.S. PATENT DOCUMENTS

| | | | | |
|---|---|---|---|---|
| 7,439,281 | B2 * | 10/2008 | Ushirogouchi | ..... C09B 67/0013 523/160 |
| 7,754,785 | B2 * | 7/2010 | Ushirogouchi | ...... C09D 17/002 523/160 |
| 8,449,101 | B2 * | 5/2013 | Yokoi | ................. B41M 5/0023 347/102 |

FOREIGN PATENT DOCUMENTS

| | | |
|---|---|---|
| JP | 2010-116460 A | 5/2010 |
| JP | 2012-116934 A | 6/2012 |
| JP | 2012-117027 A | 6/2012 |
| JP | 2012-140491 A | 7/2012 |
| JP | 2012-158638 A | 8/2012 |
| JP | 2014-172956 A | 9/2014 |
| WO | WO 2010/143738 A1 | 12/2010 |

OTHER PUBLICATIONS

International Search Report mailed by Japan Patent Office dated Mar. 1, 2016 in the corresponding PCT Application No. PCT/JP2015/085004.
International Preliminary Report on Patentability and Written Opinion of the International Searching Authority in PCT Application No. PCT/JP2015/085004, dated Aug. 29, 2017.

* cited by examiner

*Primary Examiner* — Anh T. N. Vo
(74) *Attorney, Agent, or Firm* — Knobbe Martens Olson & Bear, LLP

(57) ABSTRACT

A photocurable ink composition for inkjet printing contains: a photopolymerizable compound that contains: virtually no vinyl formamide; 0.1 to 20 percent by mass of a monofunctional monomer containing an ether group relative to the total mass of the photopolymerizable component; 65 to 85 percent by mass of a monofunctional monomer containing a cyclic structure relative to the total mass of the photopolymerizable component; 0.1 to 25 percent by mass of a multifunctional monomer containing an amino group relative to the total mass of the photopolymerizable component; and 5 to 35 percent by mass of a monomer containing a trimethylol propane skeleton relative to the total mass of the photopolymerizable component; and an acyl phosphine oxide photopolymerization initiator by 3 to 20 percent by mass relative to the total mass of the photopolymerizable component; wherein the viscosity of said photocurable ink composition for inkjet printing is 100 mPa·s or less at 25° C.

4 Claims, No Drawings

US 10,035,919 B2

PHOTOCURABLE INK COMPOSITION FOR INKJET PRINTING

This application is the U.S. National Phase under 35 U.S.C. § 371 of International Application PCT/JP2015/085004, filed Dec. 15, 2015, which claims priority to Japanese Patent Application No. 2015-037076, filed Feb. 26, 2015. The International Application was published under PCT Article 21(2) in a language other than English.

TECHNICAL FIELD

The present invention relates to a photocurable ink composition for inkjet printing, as well as an inkjet printing method. More specifically, the present invention relates to a photocurable ink composition for inkjet printing that exhibits good properties including curability (curability in thin film form) under ultraviolet light generated by a light source using light-emitting diodes (LEDs), adhesion to polyvinyl chloride sheets, etc., solvent resistance, scratch resistance, discharge stability, and storage stability.

BACKGROUND ART

Lately, there have been a growing number of opportunities where the inkjet recording method is utilized for the purpose of producing large outdoor advertisements, etc., that require a wide image area. Base materials used for these large outdoor advertisements include polyvinyl chloride sheets having strength to withstand outdoor use, such as sheets made solely of polyvinyl chloride resin, as well as tarpaulin and other sheets made of composite materials. As inkjet printing inks used for printing on these polyvinyl chloride sheets, photocurable ink compositions for inkjet printing that do not use volatile components are proposed.

For the aforementioned outdoor advertisements, etc., to withstand weather, not only must their base material be tough, but the ink composition must also be able to form a tough film. However, photocurable materials that can form a tough film tend to have lower adhesion to the base materials because the films are generally very hard. For an ink composition of the aforementioned type, therefore, sometimes a method is adopted whereby a component that dissolves the base material is blended into the ink so as to improve its adhesion to the base material. For example, an active energy ray-curable inkjet ink that contains, at a specific ratio, a compound containing ethylene double bonds that does not dissolve polyvinyl chloride, and a component containing ethylene double bonds (N-vinyl caprolactam) that dissolves polyvinyl chloride is proposed for use on a polyvinyl chloride sheet (refer to Patent Literature 1).

However, use of such inkjet ink to manufacture printed matter presents a problem in that the printed matter cockles easily (cockling refers to deflection of the base material), although the ink adheres to a polyvinyl chloride sheet favorably.

In addition, when images are cured using a metal halide lamp or other conventional, generally used high-energy light source, problems also occur such as generation of ozone, need to increase the size of the irradiating equipment, shorter service life of the lamp, etc. Accordingly, low-energy light-emitting diode lamps (LED lamps) are used as light sources in recent years. This gives rise to such requirements as curability under LED lamps, printing performance (adhesion, improvement of cockling, etc.), and safety (flash point, irritability, etc.), and photocurable ink compositions for inkjet printing that can meet these requirements are proposed.

Among such photocurable ink compositions for inkjet printing that have been proposed are, for example: a photocurable ink composition for inkjet printing that contains pigment, benzyl acrylate, N-vinyl caprolactam, acrylated amine compound having two photopolymerizable function groups and two amino groups in its molecule, and sensitizer (refer to Patent Literature 2); and a photocurable ink composition for inkjet printing that contains pigment, specified amount of a compound having (meth)acrylate and vinyl ether groups in its molecule, and specified amount of vinyl caprolactam (refer to Patent Literature 3).

BACKGROUND ART LITERATURE

Patent Literature

Patent Literature 1: Japanese Patent Laid-open No. 2012-158638

Patent Literature 2: International Patent Laid-open No. 2010/143738

Patent Literature 3: Japanese Patent Laid-open No. 2012-116934

SUMMARY OF THE INVENTION

Problems to Be Solved by the Invention

Accordingly, an object of the present invention is to provide a photocurable ink composition for inkjet printing that exhibits good properties including curability in thin film form under ultraviolet light, especially ultraviolet light generated by a light source using light-emitting diodes (LEDs), adhesion to polyvinyl chloride sheets, etc., solvent resistance, scratch resistance, discharge stability, and storage stability.

Means for Solving the Problems

After conducting a research in earnest to achieve the aforementioned object, the inventors of the present invention found that all of the details of the aforementioned object would be achieved using a photopolymerizable component of photocurable ink composition for inkjet printing which contains virtually no vinyl formamide but contains specified amounts, relative to the total mass of the photopolymerizable component, of a monofunctional monomer containing an ether group, a monofunctional monomer containing a cyclic structure, and a multifunctional monomer containing an amino group, and a specified amount of a monomer containing a trimethylol propane skeleton; and a photopolymerization initiator thereof which contains an acyl phosphine oxide compound; and consequently completed the present invention.

In other words, the present invention provides (1) a photocurable ink composition for inkjet printing that contains: a photopolymerizable compound that contains: virtually no vinyl formamide; 0.1 to 20 percent by mass of a monofunctional monomer containing an ether group relative to the total mass of the photopolymerizable component; 65 to 85 percent by mass of a monofunctional monomer containing a cyclic structure relative to the total mass of the photopolymerizable component; 0.1 to 25 percent by mass of a multifunctional monomer containing an amino group relative to the total mass of the photopolymerizable component; 5 to 35 percent by mass of a monomer containing a trimethylol propane skeleton relative to the total mass of the photopolymerizable component; and an acyl phosphine oxide photopolymerization initiator by 3 to 20 percent by mass relative to the total mass of the photopolymerizable component; wherein, the viscosity of said photocurable ink composition for inkjet printing is 100 mPa·s or less at 25° C.

In addition, the present invention provides (2) a photocurable ink composition for inkjet printing according to (1) above, characterized in that: the monofunctional monomer containing an ether group is at least one type of compound selected from tetrahydrofurfuryl acrylate, phenoxy ethyl acrylate, ethylene oxide modified phenol acrylate, ethyl carbitol acrylate, and 2-methoxy ethyl acrylate; and the monofunctional monomer containing a cyclic structure is at least one type of compound selected from benzyl acrylate, cyclohexyl acrylate, phenoxy ethyl acrylate, and ethylene oxide modified phenol acrylate, acryloyl morpholine, isobornyl acrylate, tetrahydrofurfuryl acrylate, and 4-tert-butylcyclohexyl acrylate.

In addition, the present invention provides (3) an inkjet printing method using a photocurable ink composition for inkjet printing according to (1) or (2) above, wherein said inkjet printing method is characterized in that: the photocurable ink composition for inkjet printing is deposited on a target recording medium; and ultraviolet light generated by a light source using light-emitting diodes and having a luminescence peak wavelength in a range of 350 to 420 nm, is irradiated onto the deposited photocurable ink composition for inkjet printing.

Effects of the Invention

The present invention can demonstrate remarkable effects in the form of excellent properties including curability in thin film form under ultraviolet light, especially the ultraviolet light generated by a light source using light-emitting diodes (LEDs), adhesion to polyvinyl chloride sheets, etc., solvent resistance, scratch resistance, discharge stability, and storage stability, by using a photocurable ink composition for inkjet printing made with a specific composition.

MODE FOR CARRYING OUT THE INVENTION

The photocurable ink composition for inkjet printing proposed by the present invention (hereinafter referred to as "ink composition proposed by the present invention") is explained in detail below.

It should be noted that, under the present invention, ultraviolet light generated by a light source using light-emitting diodes (LEDs), as mentioned below, is defined as "light irradiated by light-emitting diodes that generate ultraviolet light whose luminescence peak wavelength is in a range of 350 to 420 nm."

The ink composition proposed by the present invention contains at least a photopolymerizable component and an acyl phosphine oxide photopolymerization initiator.
<Photopolymerizable Component>

With the ink composition proposed by the present invention, the photopolymerizable component contains virtually no vinyl formamide but contains four components including a monofunctional monomer containing an ether group, a monofunctional monomer containing a cyclic structure, a multifunctional monomer containing an amino group, and a monomer containing a trimethylol propane skeleton.

Here, one type of compound may be contained in multiple components of these four components, or it may be contained in any one component.

Because the photopolymerizable component contains virtually no vinyl formamide, the photocurable ink composition for inkjet printing proposed by the present invention, which is manufactured through a pigment dispersion step, achieves good discharge stability and storage stability. Also, because the photopolymerizable component contains a monofunctional monomer containing an ether group, a monofunctional monomer containing a cyclic structure, a multifunctional monomer containing an amino group, and a monomer containing a trimethylol propane skeleton, a viscosity of 100 mPa·s or less at 25° C. is achieved, along with excellent photocurability, particularly curability (curability in thin film form) under ultraviolet light generated by a light source using light-emitting diodes (LEDs), as well as good adhesion to polyvinyl chloride sheets, etc., and good discharge stability.

It should be noted that, under the present invention, "contains virtually no vinyl formamide" means that the concentration of vinyl formamide in the photocurable ink composition for inkjet printing proposed by the present invention is 2 percent by mass or less, 1 percent by mass or less, even lower such as 0.5 percent by mass or less, or 0 percent by mass at the lowest, relative to the total mass of the photopolymerizable component.

The monofunctional monomer containing an ether group may be (meth)acryloyl morpholine, 2-methoxy ethyl (meth)acrylate, ethoxy ethyl (meth)acrylate, ethyl carbitol acrylate, tetrahydrofurfuryl (meth)acrylate, phenoxy ethyl (meth)acrylate, ethylene oxide modified phenol (meth)acrylate, 3-methoxy butyl (meth)acrylate, ethoxy ethoxy ethyl (meth)acrylate, butoxy ethyl (meth)acrylate, ethoxy diethylene glycol (meth)acrylate, methoxy dipropylene glycol (meth)acrylate, or any of the foregoing that has been modified by ethylene oxide or propylene oxide, or the like. Any one type, or two or more types if necessary, of monofunctional monomer(s) containing ether group(s) may be selected from the foregoing and used.

The content of the monofunctional monomer containing an ether group is 0.1 to 20 percent by mass, or preferably 5 to 15 percent by mass, relative to the total mass of the photopolymerizable component. If the content of the monofunctional monomer containing an ether group is less than 0.1 percent by mass, the curability in thin film form of printed matter obtained using the photocurable ink composition for inkjet printing proposed by the present invention drops; if the content exceeds 20 percent by mass, on the other hand, the solvent resistance, against isopropyl alcohol or other solvents, of printed matter obtained using the photocurable ink composition for inkjet printing proposed by the present invention tends to drop.

Examples of the monofunctional monomer containing a cyclic structure include tetrahydrofurfuryl (meth)acrylate, phenoxy ethyl (meth)acrylate, and ethylene oxide modified phenol (meth)acrylate that have been cited as specific examples of the monofunctional monomer containing an ether group; and benzyl (meth)acrylate, 4-tert-butyl cyclohexyl (meth)acrylate, cyclohexyl (meth)acrylate, isobornyl (meth)acrylate, etc., that are specific examples other than monofunctional monomers containing ether groups. Any one type, or two or more types if necessary, of monofunctional monomer(s) containing a cyclic structure may be selected from the foregoing and used.

Under the present invention, the content of the monofunctional monomer containing a cyclic structure is 65 to 85 percent by mass, or preferably 70 to 85 percent by mass, relative to the total mass of the photopolymerizable component. If the content is less than 70 percent by mass relative to the total mass of the photopolymerizable component, the adhesion to polyvinyl chloride sheets, of the photocurable ink composition for inkjet printing proposed by the present invention, tends to drop; if the content exceeds 85 percent by mass, on the other hand, the scratch resistance and solvent resistance of printed matter obtained using the photocurable ink composition for inkjet printing proposed by the present invention tend to drop.

Examples of the multifunctional monomer containing an amino group include CN371, CN550, and CN551 manufactured by Sartomer; AgiSyn001, AgiSyn002, AgiSyn003, AgiSyn005, AgiSyn006, AgiSyn007, and AgiSyn008 manufactured by DSM-Agi; EBECRYL80 and EBECRYL7100 manufactured by Daicel-Allnex (all are product names), etc.

Under the present invention, the content of the multifunctional monomer containing an amino group is 0.1 to 25 percent by mass, or preferably 2 to 8 percent by mass, relative to the total mass of the photopolymerizable component. If the content is less than 0.1 percent by mass relative to the total mass of the photopolymerizable component, the curability of the printed matter that has been formed using the photocurable ink composition for inkjet printing proposed by the present invention drops; if the content exceeds 25 percent by mass, on the other hand, high viscosity of the photocurable ink composition for inkjet printing proposed by the present invention may present discharge problems.

Under the present invention, the content of the monomer containing a trimethylol propane skeleton is 5 to 35 percent by mass, or preferably 10 to 30 percent by mass, relative to the total mass of the photopolymerizable component. If the content of the monomer containing a trimethylol propane skeleton is less than 5 percent by mass, the scratch resistance and solvent resistance, against isopropyl alcohol or other solvents, of the printed matter that has been formed using the photocurable ink composition for inkjet printing proposed by the present invention drop; if the content exceeds 35 percent by mass, on the other hand, the adhesion to polyvinyl chloride sheets, of the printed matter that has been formed using the photocurable ink composition for inkjet printing proposed by the present invention, drops.

It should be noted that if compounds corresponding to two or more types of the various monomers among monofunctional monomers containing ether groups, monofunctional monomers containing a cyclic structure, multifunctional monomers containing amino groups, and monomers containing a trimethylol propane skeleton as mentioned above are used, such compounds are treated as respective monomers of the various monomers.

Furthermore, as the photopolymerizable component constituting the photocurable ink composition for inkjet printing proposed by the present invention, any photopolymerizable component other than the specific monomers and photopolymerizable component mentioned above may be combined at a content that does not cause the performance of the present invention to drop. For such other photopolymerizable component, monomers, prepolymers, oligomers, etc., may be used without any specific limitation so long as they are compounds containing ethylene double bonds.

Examples of the other photopolymerizable component include low-viscosity photopolymerizable components such as isobutyl acrylate, isooctyl acrylate, isodecyl acrylate, etc., as well as urethane (meth)acrylate, epoxy (meth)acrylate, polyester (meth)acrylate, 2-hydroxy ethyl (meth)acrylate, 2-hydroxy propyl (meth)acrylate, 4-hydroxy butyl (meth)acrylate, t-butyl (meth)acrylate, and the like. Any one type, or two or more types if necessary, of other photopolymerizable components may be selected from the foregoing and used.

<Acyl Phosphine Oxide Photopolymerization Initiator>

The photocurable ink composition for inkjet printing proposed by the present invention contains an acyl phosphine oxide photopolymerization initiator.

For the acyl phosphine oxide photopolymerization initiator, an acyl phosphine oxide photopolymerization initiator (compound) that manifests initiator function under light of 450 to 300 nm in wavelength is used. It should be noted that "manifests initiator function under light of 450 to 300 nm in wavelength" means having light absorption characteristics over the entire wavelength range of 450 to 300 nm. By using such acyl phosphine oxide photopolymerization initiator, LED curability can be further added to the photocurable ink composition for inkjet printing proposed by the present invention.

Specific examples include 2,4,6-trimethylbenzoyl-diphenyl-phosphine oxide (product name: TPO, manufactured by Lambson), bis(2,4,6-trimethylbenzoyl)-phenyl phosphine oxide (product name: IRGACURE819, manufactured by BASF), and the like.

The content of any such acyl phosphine oxide photopolymerization initiator is in a range of 3 to 20 percent by mass, or more preferably in a range of 5 to 15 percent by mass, relative to the total mass of the photopolymerizable component. If the content of the acyl phosphine oxide photopolymerization initiator is less than 3 percent by mass, curability may not be sufficient. If the content exceeds 20 percent by mass, on the other hand, the storage stability of the photocurable ink composition for inkjet printing proposed by the present invention drops.

<Sensitizer>

The photocurable ink composition for inkjet printing proposed by the present invention may also use, in combination, a photosensitizer (compound) that has light absorption characteristics under ultraviolet light in a range of primarily 400 nm or more in wavelength and manifests curing reaction sensitization function under light of wavelength in this range in order to promote curability under ultraviolet light generated by a light source using light-emitting diodes (LEDs).

It should be noted that "manifests sensitization function under light of 400 nm or more in wavelength" above means having light absorption characteristics in a wavelength range of 400 nm or more. By using such sensitizer, the LED curability of the photocurable ink composition for inkjet printing proposed by the present invention can be promoted.

Examples of the photosensitizer include an anthracene sensitizer, a thioxanthone sensitizer, etc., and preferably a thioxanthone sensitizer. Any of the foregoing may be used alone, or two or more types may be used in combination.

Specific examples include 9,10-dibutoxy anthracene, 9,10-diethoxy anthracene, 9,10-dipropoxy anthracene, 9,10-bis (2-ethylhexyloxy) anthracene, and other anthracene sensitizers, as well as 2,4-diethyl thioxanthone, 2-isopropyl thioxanthone, 4-isopropyl thioxanthone, and other thioxanthone sensitizers. Representative examples of commercial products include DBA and DEA (manufactured by Kawasaki Kasei Chemicals) for anthracene derivatives, and DETX and ITX (manufactured by Lambson) for thioxanthone derivatives, among others.

The content of the sensitizer is in a range of 0 to 4 percent by mass relative to the total mass of the photopolymerizable component. If the content exceeds 4 percent by mass, the sensitizer is added excessively without any improvement in effects, which is not desirable.

It should be noted that, if a thioxanthone sensitizer is used for the sensitizer, the photocurable ink composition for inkjet printing tends to turn yellow, meaning that it assumes a hue yellower than the color based on the pigment (original hue); accordingly, preferably the content of the thioxanthone sensitizer is determined as deemed appropriate for each color.

To be specific, preferably a white ink composition or clear ink composition which is more susceptible to change in color does not contain any thioxanthone compound as the sensitizer. Also, in the case of a magenta ink composition or cyan ink composition, where hue change presents a problem, preferably any thioxanthone compound is used to the extent that it does not present a hue problem. With a blank ink composition or yellow ink composition, on the other hand, preferably the sensitizer combines a thioxanthone compound because yellowing, should it occur, does not affect the hue, and also photopolymerization occurs less in a black ink composition or a yellow ink composition compared to inks of other hues.

<Coloring Agent>

The photocurable ink composition for inkjet printing proposed by the present invention may contain a coloring agent of each hue, so that a photocurable ink composition for inkjet printing for each color can be obtained.

For such coloring agent, any pigment or dye traditionally used in a standard photocurable ink composition for inkjet printing may be used without any specific limitation; when light resistance is considered, however, organic pigments or inorganic pigments, etc., are preferred.

Organic pigments include, for example, dye lake pigments, as well as azo, benzoimidazolone, phthalocyanine, quinacridone, anthraquinone, dioxazine, indigo, thioindigo, perylene, perynone, diketopyrrolopyrrole, isoindolinone, nitro, nitroso, anthraquinone, flavanthrone, quinophthalone, pyranthrone, and indanthrone pigments, among others. Inorganic pigments include carbon black, titanium oxide, red iron oxide, graphite, iron black, chromium oxide green, and aluminum hydroxide, among others.

Also, the following provides specific examples of pigments, by each representative hue, for the photocurable ink composition for inkjet printing proposed by the present invention.

First, yellow pigments to be used for a photocurable yellow ink composition for inkjet printing include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., of which C. I. Pigment Yellow 150, 155, 180, 213 are preferred, etc.

Magenta pigments to be used for a photocurable magenta ink composition for inkjet printing include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., of which C. I. Pigment Red 122 and 202 and Pigment Violet 19 are preferred, among others.

Cyan pigments to be used for a photocurable cyan ink composition for inkjet printing include, for example, C. I. Pigment Blue 1, 2, 3, 15, 15:1, 15:2, 15:3, 15:4, 15:6, 16, 18, 22, 27, 29, 60, etc., of which C. I. Pigment Blue 15:4 is preferred, etc.

Black pigments to be used for a photocurable black ink composition for inkjet printing include, for example, carbon black (C. I. Pigment Black 7), etc.

White pigments to be used for a photocurable white ink composition for inkjet printing include, for example, titanium oxides, aluminum oxides, etc., of which titanium oxides that have been surface-treated with any of the various materials including alumina and silica are preferred.

Preferably the content of the pigment in the photocurable ink composition for inkjet printing proposed by the present invention is 1 to 20 percent by mass relative to the total amount of the photocurable ink composition for inkjet printing. If the content of the pigment is less than 1 percent by mass, the image quality of the obtained printed matter tends to drop. If the content exceeds 20 percent by mass, on the other hand, the viscosity characteristics of the photocurable ink composition for inkjet printing tend to be negatively affected.

<Pigment Dispersant>

Also, the photocurable ink composition for inkjet printing proposed by the present invention may contain a pigment dispersant, if necessary.

The pigment dispersant is used to improve the pigment dispersibility and the preservation stability of the ink composition proposed by the present invention, and any conventional pigment dispersant may be used without any specific limitation; of conventional pigment dispersants, however, preferably polymer dispersants are used. These pigment dispersants include carbodiimide dispersants, polyester amine dispersants, aliphatic amine dispersants, modified polyacrylate dispersants, modified polyurethane dispersants, multi-chain polymer non-ion dispersants, polymer ion activators, etc. Any of these pigment dispersants may be used alone, or two or more types may be used in combination.

Preferably the content of the pigment dispersant is 1 to 200 parts by mass when the total amount of pigment used represents 100 parts by mass. If the content of the pigment dispersant is less than 1 part by mass, the pigment dispersibility, and the storage stability of the ink composition proposed by the present invention, may drop. On the other hand, the content of the pigment dispersant may be more than 200 parts by mass, but this may not result in any difference in effects. A more preferable lower limit of the content of the pigment dispersant is 5 parts by mass, while a more preferable upper limit is 60 parts by mass.

<Surface-Active Agent>

Preferably the photocurable ink composition for inkjet printing proposed by the present invention contains, as a surface-active agent, any silicone surface-active agent or other surface-active agent conventionally used in photocurable ink compositions for inkjet printing proposed, according to the inkjet head used, in order to improve the discharge stability.

Specific examples of silicone surface-active agents include polyether modified silicone oil, polyester modified polydimethyl siloxane, polyester modified methyl alkyl polysiloxane, etc. Any of the foregoing may be used alone, or two or more types may be used in combination.

The content of the surface-active agent in the ink composition proposed by the present invention is 0.005 to 1.0 percent by mass. If the content is less than 0.005 percent by mass, the surface tension of the photocurable ink composition for inkjet printing proposed by the present invention increases, and the discharge stability from the inkjet head drops. If the content exceeds 1.0 percent by mass, on the other hand, bubbles in the photocurable ink composition for inkjet printing increase, and the discharge stability drops.

<Additives>

Various types of additives may be added to the photocurable ink composition for inkjet printing proposed by the present invention in order to manifest various functionalities, as necessary. Specific examples include photostabilizers, surface-treatment agents, anti-oxidants, anti-aging agents, cross-linking promoters, polymerization inhibitors, plasticizers, preservatives, pH adjustment agents, defoaming agents, humectants, etc.

Preferably the photocurable ink composition for inkjet printing proposed by the present invention that is obtained using the materials above has a flash point of 70° C. or above as measured with a Setaflash closed-cup flash point tester conforming to JIS K2265. Having such flash point, the ink composition proposed by the present invention conforms to Flammable Liquid Category 4 under GHS and, as such, presents excellent safety backed by low flammability, etc.

Also, the photocurable ink composition for inkjet printing proposed by the present invention has a viscosity of 100 mPa·s or lower at 25° C. Furthermore, the photocurable ink composition for inkjet printing can be designed with a specific viscosity suitable for each inkjet device.

It should be noted that, in this Specification, "viscosity" represents the viscosity measured with a type E viscometer (product name: RE100L Viscometer, manufactured by Toki Sangyo) under the condition of 25° C. and 20 rpm.

As it contains the aforementioned specific photopolymerizable component and acyl phosphine oxide photopolymerization initiator by specified amounts, the photocurable ink composition for inkjet printing proposed by the present invention offers excellent curability under ultraviolet light, especially ultraviolet light generated by a light source using light-emitting diodes (LEDs), good adhesion to flooring materials and base materials such as polyvinyl chloride and polycarbonate, good scratch resistance, excellent discharge stability and storage stability, and excellent overall safety backed by high flash point, low skin irritability, and low odor.

The method for preparing the ink composition proposed by the present invention is not limited in any way, and it may be prepared by adding all of the aforementioned materials and mixing them together in a bead mill, three-roll mill, etc.

It should be noted that the ink composition proposed by the present invention may be prepared by mixing the pigment, pigment dispersant, and photopolymerizable component to obtain a concentrated emulsified ink (conc. base ink) beforehand and then adding to this conc. base ink the photopolymerizable component, acyl phosphine oxide photopolymerization initiator, and surface-active agent and other additives as necessary, so as to achieve a desired photocurable ink composition for inkjet printing.

Preferably the base material on which the ink composition proposed by the present invention is printed is flooring material, vinyl chloride, polycarbonate, etc.; however, any base material conventionally printed with a photocurable ink composition for inkjet printing (such as paper, plastic film, capsule, gel, metal foil, glass, or cloth) may be printed on without problem.

Specific methods to print and cure the ink composition proposed by the present invention include a method whereby the ink composition proposed by the present invention is discharged onto the base material using an inkjet head, after which the film of the ink composition that has landed on the base material is exposed to and cured under light.

For example, the ink composition proposed by the present invention may be discharged onto the base material (to print images) by supplying it to a printer head for an inkjet recording printer that can handle low-viscosity inks and then discharging the ink composition from the printer head so as to form a film of 1 to 60 µm in thickness on the base material, for example. Also, the film of the ink composition proposed by the present invention may be exposed to and cured under light (to harden the images) by irradiating light onto the film of the ink composition that has been applied onto the base material as images.

For the inkjet recording printer device used for printing the ink composition proposed by the present invention, any conventionally used inkjet recording printer device may be used. It should be noted that, if a continuous-type inkjet recording printer device is used, a conductivity-imparting agent is further added to the ink composition proposed by the present invention to adjust its electrical conductivity.

The light source for curing the aforementioned film may be ultraviolet (UV) light, UV light-emitting diodes (LEDs), electron beams, visible light, etc. From an environmental viewpoint, however, preferably light-emitting diodes (LEDs) that generate ultraviolet light whose luminescence peak wavelength is in a range of 350 to 420 nm are used.

EXAMPLES

Examples 1 to 7 and Comparative Examples 1 to 9

Preparation of Photocurable Ink Composition for Inkjet Printing

The present invention is explained in greater detail below using examples; however, the present invention is not limited to these examples. It should be noted that "percent" means "percent by mass," and "part" means "part by mass" unless otherwise specified.

The materials used in the following examples and comparative examples are listed below.
<Pigment Dispersant>
Solsperse 56000 (manufactured by Lubrizol)
<Photopolymerizable Components>
Viscoat #160: Benzyl acrylate (manufactured by Osaka Organic Chemical Industry)
Beamset 770: Vinyl formamide (manufactured by Arakawa Chemical Industries)
SR285: Tetrahydrofurfuryl acrylate (manufactured by Sartomer)
SR351: Trimethylol propane triacrylate (manufactured by Sartomer)
SR454: Trimethylol propane ethylene oxide adduct triacrylate (manufactured by Sartomer)
SR440: Isodecyl acrylate (manufactured by Sartomer)
V-CAP: Vinyl caprolactam (manufactured by ISP Japan)
AgiSyn008: Multifunctional monomer containing an amino group (manufactured by DSM-Agi)
<Acyl Phosphine Oxide Photopolymerization Initiator>
TPO: 2,4,6-trimethylbenzoyl-diphenyl-phosphine oxide (manufactured by Lambson)
<Non-acyl Phosphine Oxide Photopolymerization Initiator>
IRGACURE184: 1-hydroxy-cyclohexyl-phenyl-ketone (manufactured by BASF)
<Sensitizer>
DETX: 2,4-diethyl thioxanthone (manufactured by Lambson)
<Additives>
UV-22: Irgastab UV 22: Mixture of 2,6-bis(1,1-dimethylethyl)-4-(phenylmethylene)-2,5-cyclohexazine-1-one and glycerol triacrylate (mass ratio 20:80) (manufactured by BASF)
BYK-315: Silicone additive (manufactured by BYK Chemie)
<Cyan Ink Compositions>

A mixture of pigment (Pigment Blue 15:4), pigment dispersant (Solsperse 56000), and polymerizable component (Viscoat #160), with the respective ingredients blended at ratios (mass ratios) of 20/8/72, was dispersed using an Eiger mill (zirconium beads of 0.5 mm in diameter were used as media), to obtain a cyan conc. base.

The respective components were blended into the obtained cyan conc. base according to the blending compositions (percent by mass) in Table 1 and mixed under agitation, to obtain the photocurable cyan ink compositions for inkjet printing in Examples 1 to 3.
<Magenta Ink Composition>

A mixture of pigment (Pigment Red 122), pigment dispersant (Solsperse 56000), and polymerizable component (Viscoat #160), with the respective ingredients blended at ratios (mass ratios) of 16/9.6/74.4, was dispersed using an Eiger mill (zirconium beads of 0.5 mm in diameter were used as media), to obtain a magenta conc. base.

The respective components were blended into the obtained magenta conc. base according to the blending composition (percent by mass) in Table 1 and mixed under agitation, to obtain the photocurable magenta ink composition for inkjet printing in Example 4.

<Yellow Ink Composition>

A mixture of pigment (Pigment Yellow 150), pigment dispersant (Solsperse 56000), and polymerizable component (Viscoat #160), with the respective ingredients blended at ratios (mass ratios) of 16/9.6/74.4, was dispersed using an Eiger mill (zirconium beads of 0.5 mm in diameter were used as media), to obtain a yellow conc. base.

The respective components were blended into the obtained yellow conc. base according to the blending composition (percent by mass) in Table 1 and mixed under agitation, to obtain the photocurable yellow ink composition for inkjet printing in Example 5.

<Black Ink Composition>

A mixture of pigment (Pigment Black 7), pigment dispersant (Solsperse 56000), and polymerizable component (Viscoat #160), with the respective ingredients blended at ratios (mass ratios) of 20/8/72, was dispersed using an Eiger mill (zirconium beads of 0.5 mm in diameter were used as media), to obtain a black conc. base.

The respective components were blended into the obtained black conc. base according to the blending composition (percent by mass) in Table 1 and mixed under agitation, to obtain the photocurable black ink composition for inkjet printing in Example 6.

<Clear Ink Composition>

The respective components were blended according to the blending composition (percent by mass) in Table 1 and mixed under agitation, to obtain the photocurable clear ink composition for inkjet printing in Example 7.

[Viscosity Measurement of Ink Compositions]

The photocurable ink compositions for inkjet printing obtained in Examples 1 to 7 and Comparative Examples 1 to 9 were measured for viscosity using a type E viscometer (product name: RE100L Viscometer, manufactured by Toki Sangyo) under the condition of 25° C. in temperature and 20 rpm in rotor speed. The results are shown in Table 1.

[Performance Evaluation of Ink Compositions]

(Standard Film Thickness)

The photocurable ink compositions for inkjet printing obtained in Examples 1 to 7 and Comparative Examples 1 to 9 were applied on PVC80 (manufactured by Lintec) using a #4 bar-coater. Next, they were cured using a UV-LED lamp manufactured by Phoseon Technology.

Curability under the UV-LED lamp, adhesion, solvent resistance, and scratch resistance, were evaluated according to the methods below. The results are shown in Table 1.

(LED Curability)

LED curability was evaluated based on the number of irradiations needed to eliminate surface tack, by irradiating with a UV-LED lamp manufactured by Phoseon Technology under the irradiating condition of 1 second of irradiation at a time (for a cumulative UV light of 60 mJ/cm$^2$ per second), with the distance between the lamp and the ink application surface adjusted to 2 cm.

(Adhesion)

The cured film of each ink composition that had been cured until there was no surface tack, was cut crosswise using a cutting knife, after which a piece of clear adhesive tape was adhered over the cut area and then peeled, to evaluate the degree of separation of the cured film according to the criteria below:

○: The cured film did not separate.

Δ: The cured film separated, but the separated area was less than 20%.

x: The separated area of the cured film was 20% or more.

(Solvent Resistance)

Using a Gakushin-type color fastness tester (manufactured by Daiei Kagaku Seiki), the cured film of the ink composition was rubbed 20 times under a load of 500 g with a bleached cotton cloth moistened with isopropyl alcohol, and to determine the level of dissolution of the cured film, the soiling of the bleached cotton cloth and the condition of the rubbed cured film surface were visually observed and evaluated according to the criteria below:

○: There was no visible soiling of the bleached cotton cloth or loss or wear of the cured film.

Δ: The bleached cotton cloth became soiled, but no loss or wear of the cured film was observed.

x: The bleached cotton cloth became soiled, and the cured film also showed loss and wear.

(Scratch Resistance)

Using a Gakushin-type color fastness tester (manufactured by Daiei Kagaku Seiki), the film was rubbed 200 times under a load of 500 g with a bleached cotton cloth, and the level of stripping-off of the film was visually observed and evaluated according to the criteria below:

○: The film was not stripped off.

Δ: The film had scratches on the surface.

x: The film was stripped off, and the base material became visible.

(Discharge Stability)

An inkjet recording device equipped with an inkjet nozzle for low-viscosity inks and the ink compositions obtained in Examples 1 to 7 and Comparative Examples 1 to 9 were let stand for 24 hours in an ambient temperature of 25° C., so that the temperature of the inkjet recording device and that of each ink composition became 25° C. Thereafter, each ink composition was printed continuously on PVC80 (manufactured by Lintec) in an ambient temperature of 25° C., to evaluate discharge stability according to the criteria below:

○: Printing was not disturbed, and the ink was discharged stably.

x: Printing was disturbed, or the ink was not discharged stably.

(Storage Stability)

The ink compositions obtained in Examples 1 to 7 and Comparative Examples 1 to 9 were each taken into a glass vial, and each glass vial was sealed and stored for seven days at 40° C., after which the condition was evaluated according to the evaluation criteria below:

○: There was no thickening or sediment.

Δ: There was slight thickening or sediment that disappeared when the vial was shaken lightly.

x: There was a lot of thickening or sediment that did not disappear even when the vial was shaken strongly.

(LED Curability in Thin Film Form)

The photocurable ink compositions for inkjet printing obtained in Examples 1 to 7 and Comparative Examples 1 to 9 were applied on PVC 80 (manufactured by Lintec) using a #3 bar-coater. Next, the ink compositions were cured using a UV-LED lamp manufactured by Phoseon Technology.

They were evaluated for curability under the UV-LED lamp according to the method below. The results are shown in Table 1.

(Curability Under UV-LED Lamp)

LED curability was evaluated based on the number of irradiations needed to eliminate surface tack, by irradiating with a UV-LED lamp manufactured by Phoseon Technology under the irradiating condition of 1 second of irradiation at a time (for a cumulative UV light of 60 mJ/cm$^2$ per second), with the distance between the lamp and the ink application surface adjusted to 2 cm.

TABLE 1

| Composition | Examples | | | | | | | Comparative examples | | | | | | | | |
|---|---|---|---|---|---|---|---|---|---|---|---|---|---|---|---|---|
| | 1 | 2 | 3 | 4 | 5 | 6 | 7 | 1 | 2 | 3 | 4 | 5 | 6 | 7 | 8 | 9 |
| Cyan Conc. Base | 8.0 | 8.0 | 8.0 | | | | | 8.0 | 8.0 | 8.0 | 8.0 | 8.0 | 8.0 | 8.0 | 8.0 | 8.0 |
| Magenta Conc. Base | | | | 8.0 | | | | | | | | | | | | |
| Yellow Conc. Base | | | | | 8.0 | | | | | | | | | | | |
| Black Conc. Base | | | | | | 8.0 | | | | | | | | | | |
| AgiSyn008 | 7.0 | 4.0 | 4.0 | 3.0 | 3.0 | 4.0 | 3.0 | 4.0 | 4.0 | 4.0 | 4.0 | 4.0 | 4.0 | | 4.0 | 4.0 |
| SR285 | 3.0 | 9.0 | 9.0 | 15.0 | 9.0 | 9.0 | 9.0 | 9.0 | 9.0 | 9.0 | | 25.0 | 9.0 | 9.0 | 9.0 | 9.0 |
| Viscoat #160 | 51.7 | 45.5 | 37.3 | 37.0 | 46.0 | 45.0 | 45.5 | 35.5 | 45.5 | 25.5 | 54.5 | 29.5 | 51.0 | 45.5 | 45.5 | 37.5 |
| SR440 | | | | | | | | | 7.0 | | | | | | | |
| SR351 | 7.0 | 10.0 | | 15.0 | 15.0 | 10.0 | 25.5 | 10.0 | 3.0 | 28.0 | 10.0 | 10.0 | 4.5 | 14.0 | 10.0 | 10.0 |
| SR454 | | | 20.0 | | | | | | | | | | | | | |
| V-CAP | 9.0 | 9.0 | 9.0 | 9.0 | 5.0 | 9.0 | 9.0 | 9.0 | 9.0 | 9.0 | 9.0 | 9.0 | 9.0 | 9.0 | 9.0 | 9.0 |
| Beamset 770 | | | | | | | | 10.0 | | | | | | | | |
| TPO | 12.0 | 12.0 | 10.0 | 10.0 | 9.0 | 9.0 | 6.0 | 12.0 | 12.0 | 14.0 | 12.0 | 12.0 | 12.0 | 12.0 | 1.8 | 20.0 |
| IRGACURE 184 | | | | | | | | | | | | | | | 10.0 | |
| DETX | 0.3 | 0.5 | 0.7 | 1.0 | 3.0 | 4.0 | | 0.5 | 0.5 | 0.5 | 0.5 | 0.5 | 0.5 | 0.5 | 0.5 | 0.5 |
| UV-22 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| BYK-315 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Mass of monofunctional monomer containing ether groups/Total mass of the photopolymerizable component | 3.6% | 10.7% | 10.5% | 17.5% | 10.6% | 10.8% | 9.7% | 10.7% | 10.7% | 11.0% | 0.0% | 29.7% | 10.7% | 10.7% | 10.7% | 11.8% |
| Mass of monofunctional monomer containing a cyclic structure/Total mass of the photopolymerizable component | 82.4% | 82.4% | 71.1% | 78.1% | 77.8% | 82.3% | 68.4% | 70.5% | 82.4% | 60.0% | 82.4% | 82.4% | 88.9% | 82.4% | 82.4% | 80.5% |
| Mass of multifunctional monomer containing amino groups/Total mass of the photopolymerizable component | 8.3% | 4.8% | 4.7% | 3.5% | 3.5% | 4.8% | 3.2% | 4.8% | 4.8% | 4.9% | 4.8% | 4.8% | 4.8% | 0.0% | 4.8% | 5.3% |
| Mass of monomer containing a trimethylol propane skeleton/Total mass of the photopolymerizable component | 8.3% | 11.9% | 23.3% | 17.5% | 17.7% | 12.0% | 27.5% | 11.9% | 3.6% | 34.1% | 11.9% | 11.9% | 5.4% | 16.7% | 11.9% | 13.1% |
| Mass of acyl phosphine oxide photopolymerization initiator/Total mass of the photopolymerizable component | 14.2% | 14.3% | 11.6% | 11.7% | 10.6% | 10.8% | 6.5% | 14.3% | 14.3% | 17.1% | 14.3% | 14.3% | 14.3% | 14.3% | 2.1% | 26.3% |
| Viscosity (MPa · s, 25° C.) | 6.2 | 6.7 | 9.3 | 7.8 | 7.9 | 6.7 | 6.8 | 6.6 | 6.2 | 9.8 | 6.8 | 6.9 | 6.2 | 5.8 | 6.9 | 8.5 |
| LED Curability (number of irradiations) | 1 | 1 | 1 | 1 | 1 | 1 | 1 | 1 | 1 | 1 | 2 | 1 | 1 | 3 | 3 | 1 |
| Adhesion | ○ | ○ | ○ | ○ | ○ | ○ | ○ | ○ | ○ | ○ | ○ | ○ | ○ | ○ | ○ | ○ |
| Solvent Resistance | ○ | ○ | ○ | ○ | ○ | ○ | ○ | ○ | × | × | ○ | × | × | ○ | ○ | ○ |
| Scratch Resistance | ○ | ○ | ○ | ○ | ○ | ○ | ○ | △ | × | ○ | ○ | ○ | × | ○ | ○ | ○ |
| Discharge Stability | ○ | ○ | ○ | ○ | ○ | ○ | ○ | × | ○ | ○ | ○ | ○ | ○ | ○ | ○ | ○ |
| Storage Stability | ○ | ○ | ○ | ○ | ○ | ○ | ○ | ○ | ○ | ○ | ○ | ○ | ○ | ○ | ○ | × |
| LED Curability in Thin Film Form (number of irradiations) | 1 | 1 | 1 | 1 | 1 | 1 | 1 | 1 | 1 | 1 | 3 | 1 | 1 | 5 | 5 | 1 |

The results shown in Table 1 indicate that, according to the photocurable ink compositions for inkjet printing in Examples 1 to 7, which conform to the present invention, excellent LED curability, adhesion, solvent resistance, scratch resistance, discharge stability, storage stability, and LED curability in thin film form can be achieved.

According to Comparative Example 1 where the ink composition contained vinyl formamide, however, discharge stability and storage stability were inferior. Also, according to Comparative Example 2 where the content of the monomer containing a trimethylol propane skeleton was low, solvent resistance and scratch resistance were inferior. According to Comparative Example 4 where the ink composition did not contain any monofunctional monomer containing an ether group, LED curability, including LED curability in thin film form, was inferior; whereas, according to Comparative Example 5 where such monomer was contained excessively, solvent resistance was inferior. According to Comparative Example 3 where the content of the monofunctional monomer containing a cyclic structure was low, adhesion was inferior; whereas, according to Comparative Example 6 where such monomer was contained excessively, solvent resistance and scratch resistance were inferior. According to Comparative Example 7 where the ink composition did not contain any multifunctional monomer containing an amino group, LED curability, including LED curability in thin film form, was inferior. According to Comparative Example 8 where the content of the acyl phosphine oxide photopolymerization initiator was low, LED curability, including LED curability in thin film form, was inferior; whereas, according to Comparative Example 9 where such polymerization initiator was contained excessively, storage stability was inferior.

These results show that the present invention can demonstrate excellent LED curability, adhesion, solvent resistance, scratch resistance, discharge stability, storage stability, and LED curability in thin film form, by using a photocurable ink composition for inkjet printing made with a specific composition.

What is claimed is:

1. A photocurable ink composition for inkjet printing comprising a photopolymerizable component that contains: virtually no vinyl formamide; 0.1 to 20 percent by mass of a monofunctional monomer containing an ether group relative to the total mass of the photopolymerizable component; 65 to 85 percent by mass of the monofunctional monomer containing a cyclic structure relative to the total mass of the photopolymerizable component; 0.1 to 25 percent by mass of a multifunctional monomer containing an amino group relative to the total mass of the photopolymerizable component; and 5 to 35 percent by mass of a monomer containing a trimethylol propane skeleton relative to the total mass of the photopolymerizable component; and an acyl phosphine oxide photopolymerization initiator by 3 to 20 percent by mass relative to the total mass of the photopolymerizable component; wherein a viscosity of said photocurable ink composition for the inkjet printing is 100 mPa·s or less at 25° C.

2. A photocurable ink composition for inkjet printing according to claim 1, characterized in that: the monofunctional monomer containing an ether group is at least one type of a compound selected from tetrahydrofurfuryl acrylate, phenoxy ethyl acrylate, ethylene oxide modified phenol acrylate, ethyl carbitol acrylate, and 2-methoxy ethyl acrylate; and the monofunctional monomer containing a cyclic structure is at least one type of compound selected from benzyl acrylate, cyclohexyl acrylate, phenoxy ethyl acrylate, ethylene oxide modified phenol acrylate, acryloyl morpholine, isobornyl acrylate, tetrahydrofurfuryl acrylate, and 4-tert-butylcyclohexyl acrylate.

3. An inkjet printing apparatus using a photocurable ink composition for inkjet printing according to claim 1, wherein said inkjet printing apparatus is characterized in that: the photocurable ink composition for inkjet printing is deposited on a target recording medium; and ultraviolet light generated by a light source using light-emitting diodes and having a luminescence peak wavelength in a range of 350 to 420 nm is irradiated onto the deposited photocurable ink composition for inkjet printing.

4. An inkjet printing apparatus using a photocurable ink composition for inkjet printing according to claim 2, wherein said inkjet printing apparatus is characterized in that: the photocurable ink composition for inkjet printing is deposited on a target recording medium; and ultraviolet light generated by a light source using light-emitting diodes and having a luminescence peak wavelength in a range of 350 to 420 nm is irradiated onto the deposited photocurable ink composition for inkjet printing.

* * * * *

UNITED STATES PATENT AND TRADEMARK OFFICE
CERTIFICATE OF CORRECTION

PATENT NO. : 10,035,919 B2
APPLICATION NO. : 15/549372
DATED : July 31, 2018
INVENTOR(S) : Tadashi Hirose Page 1 of 1

It is certified that error appears in the above-identified patent and that said Letters Patent is hereby corrected as shown below:

In the Specification

Column 7, Line 22, change "perynone," to --perinone,--.

Column 13-14, Line 16 (approx.), change "10.0" to --10.2--.

Column 13-14, Line 31 (approx.), change "Viscosity (MPa · s," to --Viscosity (mPa·s,--.

Signed and Sealed this
Ninth Day of April, 2019

Andrei Iancu
*Director of the United States Patent and Trademark Office*